(12) United States Patent
Katano

(10) Patent No.: US 9,667,834 B1
(45) Date of Patent: May 30, 2017

(54) METHOD THAT PERFORMS FROM SCANNING TO STORING SCAN DATA USING SCAN SEND TICKET

(71) Applicant: Kyocera Document Solutions Inc., Osaka (JP)

(72) Inventor: Seiichi Katano, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/979,582

(22) Filed: Dec. 28, 2015

(51) Int. Cl.
H04N 1/00 (2006.01)
H04N 1/44 (2006.01)
H04N 1/04 (2006.01)

(52) U.S. Cl.
CPC ............... *H04N 1/444* (2013.01); *H04N 1/04* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,164,770 B2 * | 4/2012 | Sawayanagi | G06F 3/1204 358/1.1 |
| 8,325,366 B2 * | 12/2012 | Yamaguchi | H04N 1/00 358/1.15 |
| 8,482,765 B2 * | 7/2013 | Wu | H04N 1/00222 358/1.13 |
| 8,516,088 B2 | 8/2013 | Bae | |
| 8,521,683 B2 * | 8/2013 | Yukumoto | G06F 12/02 707/609 |
| 8,730,510 B2 * | 5/2014 | Takano | H04N 1/00217 358/1.13 |
| 8,745,176 B2 * | 6/2014 | Lee | H04L 41/0806 709/220 |
| 9,001,359 B2 * | 4/2015 | Fuse | H04N 1/00222 358/1.15 |
| 9,313,356 B2 * | 4/2016 | Homma | H04N 1/00957 |
| 2006/0087688 A1 * | 4/2006 | Itogawa | H04N 1/00236 358/1.15 |
| 2006/0256392 A1 * | 11/2006 | Van Hoof | H04N 1/00209 358/402 |
| 2009/0100155 A1 | 4/2009 | Lee | |
| 2009/0279134 A1 * | 11/2009 | Fujii | H04N 1/00244 358/1.15 |
| 2010/0020353 A1 | 1/2010 | Yamaguchi | |
| 2014/0293361 A1 | 10/2014 | Mori et al. | |

* cited by examiner

*Primary Examiner* — Paul F Payer
(74) *Attorney, Agent, or Firm* — James Judge

(57) ABSTRACT

An image scanning method includes: generating, in a terminal, a scan job ticket as a data file containing content of a job for storing scan data, generated by image scanning, in a storage; based on the content of the job, generating, in an image scanning apparatus, a scan send ticket as a data file for sending the scan data; transmitting the scan job ticket from the terminal to the image scanning apparatus; in response to the receiving of the scan job ticket, authenticating, in the image scanning apparatus, the scan job ticket based on authentication information in the scan send ticket; and in response to the authentication, storing the scan data in the storage according to the content of the job.

20 Claims, 16 Drawing Sheets

FIG. 13

Scan send ticket setting — 131d

User information / User setting — 138d

Validity period: ON/OFF ●ON ○OFF — 138g

Validity period: Time    12:00-16:00 — 138e

138f — OK  Cancel

Address book
Scan send ticket
E-mail
Scan

Send screen — 131e

| | Transmission destination | User | Detail | |
|---|---|---|---|---|
| 1 | smith_PC | smith | SST | |
| 2 | | | | |
| 3 | | | | |
| 4 | | | | |
| 5 | | | | |

— 134e

Address book
Scan send ticket
E-mail
Scan — 136e

METHOD THAT PERFORMS FROM SCANNING TO STORING SCAN DATA USING SCAN SEND TICKET

BACKGROUND

Unless otherwise indicated herein, the description in this section is not prior art to the claims in this application and is not admitted to be prior art by inclusion in this section.

For an image forming apparatus (for example, printer, multifunction printer, or multi-functional peripheral), a function that transmits obtained scan data to a storage region connected to a network has been proposed. Specifically, for example, when handling scan data received in a fax, a technique that easily performs setting to sort the received scan data so as to store into a plurality of folders has been proposed. On the other hand, the following technique has also been proposed; the technique that specifies destinations of such as facsimile, e-mail, and file transfer with reference to address book data and registers and obtains some attribute information of a plurality of users collectively in a short time in a method for transmitting various data to its destination.

However, the multifunctionality of the image forming apparatus has caused a problem of complicated operation of the image forming apparatus.

SUMMARY

An image scanning method according to one aspect of the disclosure includes: generating, in a terminal, a scan job ticket as a data file containing content of a job for storing scan data, generated by image scanning, in a storage; based on the content of the job, generating, in an image scanning apparatus, a scan send ticket as a data file for sending the scan data; transmitting the scan job ticket from the terminal to the image scanning apparatus; in response to the receiving of the scan job ticket, authenticating, in the image scanning apparatus, the scan job ticket based on authentication information in the scan send ticket; and in response to the authentication, storing the scan data in the storage according to the content of the job.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 13 illustrates an explanatory view representing a user interface screen used at the SST preparing process according to the second embodiment.

DETAILED DESCRIPTION

Figure 1:
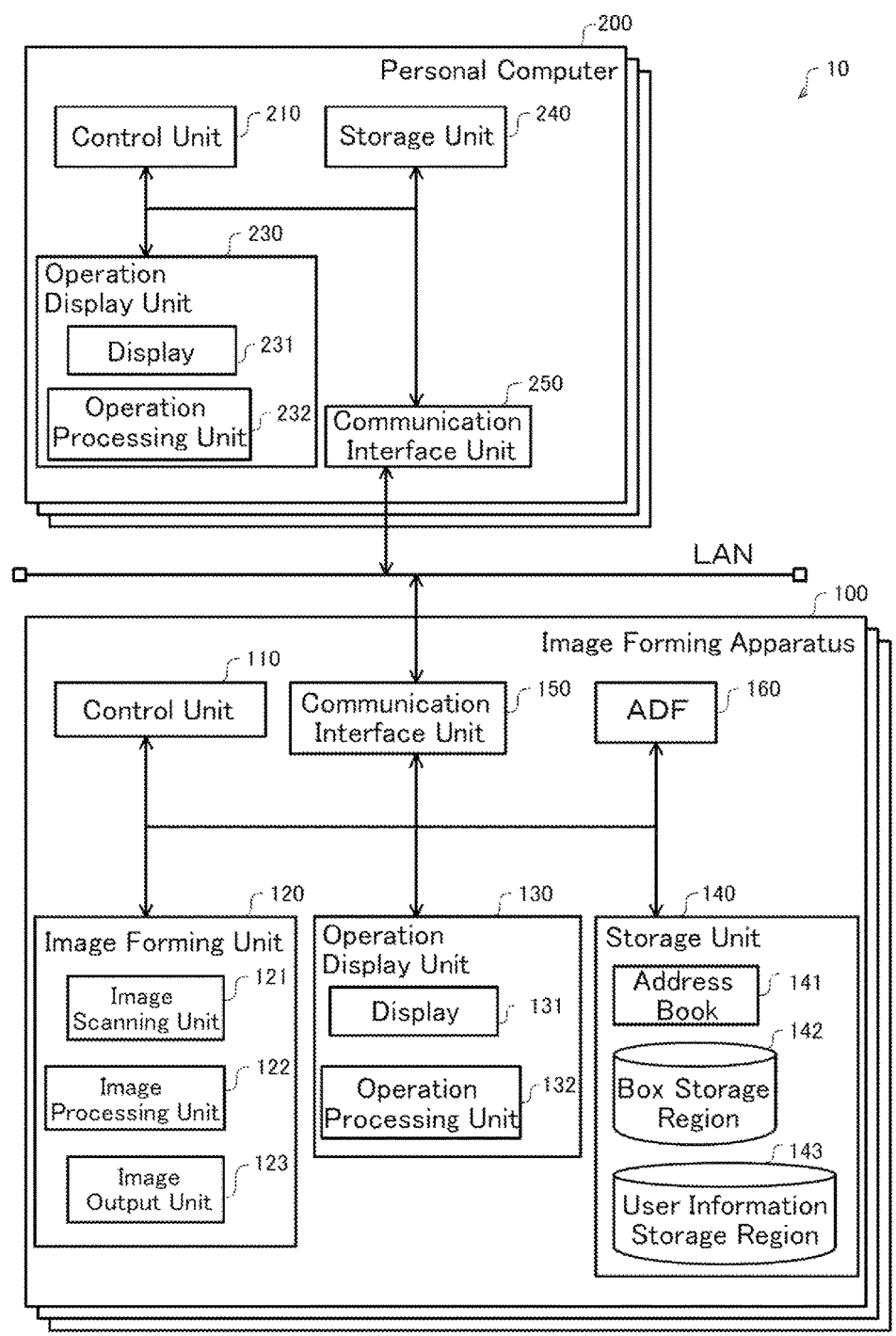
FIG. 1 illustrates a block diagram representing a functional configuration of an image forming system 10 according to the first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. First Embodiment

The following describes embodiments of the disclosure (hereinafter referred to as, the "embodiments") with reference to the drawings.

FIG. 1 illustrates a block diagram representing a functional configuration of an image forming system 10 according to first embodiment of the disclosure. The image forming system 10 includes a plurality of image forming apparatuses 100 and a plurality of personal computers 200. The plurality of personal computers 200 are connected to the plurality of image forming apparatuses 100 via a network (which is a LAN in this example). The image forming system 10 is configurable even if the respective numbers of the personal computer 200 and the image forming apparatus 100 is one.

The image forming apparatus 100 includes a control unit 110, an image forming unit 120, an operation display unit 130, a storage unit 140, a communication interface unit 150, and an automatic document feeder (ADF) 160. The personal computer 200 includes a control unit 210, an operation display unit 230, a storage unit 240, and a communication interface unit 250.

The communication interface unit 150 and the communication interface unit 250 communicate using a transmission control protocol/Internet protocol (TCP/IP) suite.

The image forming unit 120 includes an image scanning unit 121, an image processing unit 122, and an image output unit 123. The image scanning unit 121 reads an image from a document to generate scan data. The image processing unit 122 processes the scan data in accordance with a print setting. The image output unit 123 prints on a printing medium based on the processed scan data.

The operation display unit 130 of the image forming apparatus 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an input operation of a user from the display 131, which functions as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also include a controller function related to an interface such as various kinds of I/Os, a universal serial bus (USB), a bus, and other hardware, and control the entire image forming apparatus 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively. The storage unit 140 further includes an address book 141, a box storage region 142, and a user information storage region 143. A storage region available for each user of the image forming apparatus 100 is allocated in the box storage region 142. The user information storage region 143 stores personal information, such a password for authentication of each user, associated with the user recorded in the address book 141.

Figure 2:
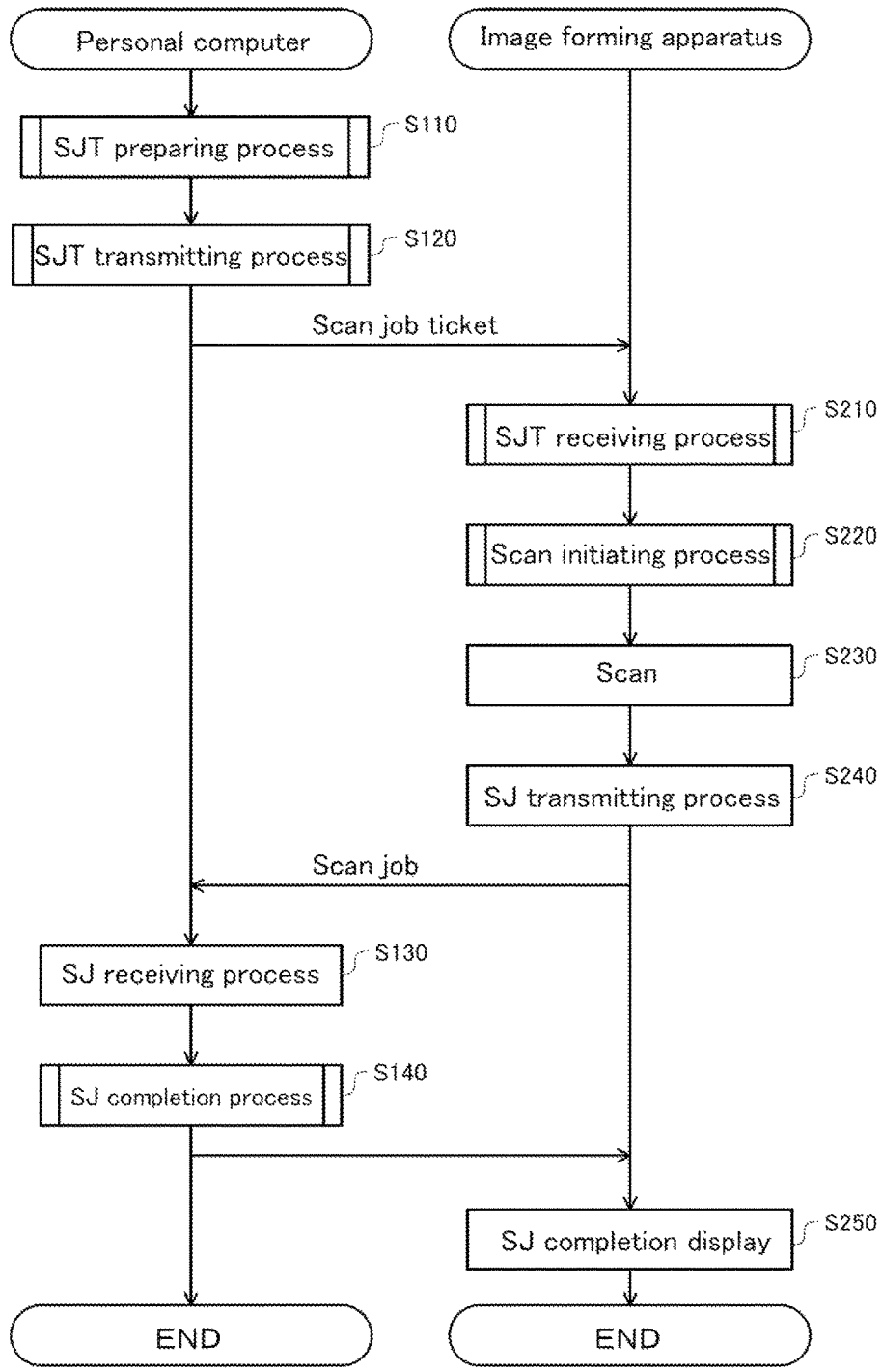
FIG. 2 illustrates a flow chart representing a content of a scan data storing process according to the first embodiment.

FIG. 2 illustrates a flow chart representing a content of a scan data storing process according to the first embodiment. This embodiment is described as one example of a client application, which operates on Windows (registered trademark) platform. The client application achieves the scan data storing process using a server message block (SMB). The SMB is a protocol and a communication service to perform such as a file sharing and a sharing of the image forming apparatus 100 by the plurality of personal computers 200 on the LAN.

The client application is stored in the storage units 140 and 240 and performed by the control units 110 and 210, respectively. The personal computer 200 and the image forming apparatus 100 operate in a Peer to Peer method as follows based on the SMB protocol.

At Step S110, a user performs an SJT preparing process on the personal computer 200. The SJT preparing process is a process that prepares a scan job ticket (SJT). The scan job ticket is a ticket as a data file for performing a job that stores scan data scanned and generated by the image forming apparatus 100 in the predetermined folder of the storage unit 240 included in the personal computer 200.

Figure 3:
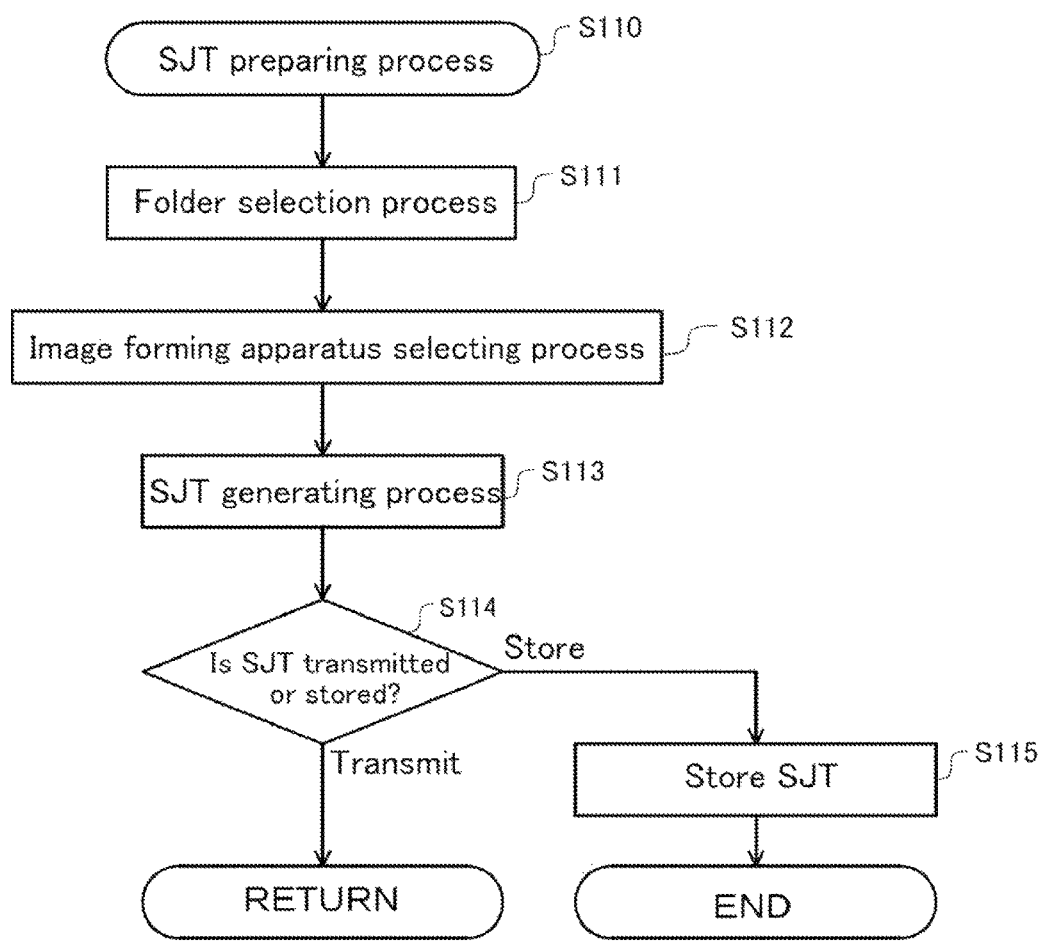
FIG. 3 illustrates a flow chart representing a content of a scan job ticket (SJT) preparing process according to the first embodiment.
Figure 4:
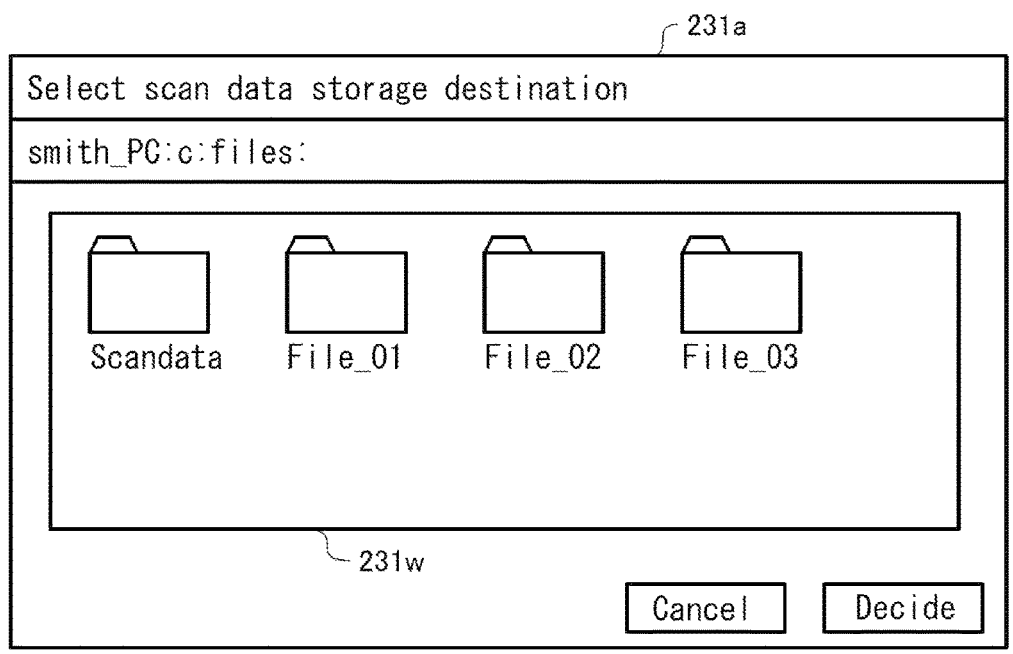
FIG. 4 illustrates an explanatory view representing a folder selection screen used at the SJT preparing process according to the first embodiment.

FIG. 3 illustrates a flow chart representing a content of the SJT preparing process according to the first embodiment. FIG. 4 illustrates an explanatory view representing a folder selection screen used at the SJT preparing process according to the first embodiment. At Step S111, the control unit 210 performs a folder selecting process. The folder selecting process is a process for selecting a folder to store the scan data.

At Step S112, the control unit 210 performs an image forming apparatus selecting process. The image forming apparatus selecting process is a process that selects the image forming apparatus 100 for scanning. The control unit 210 displays a screen for selecting the image forming apparatus 100 (not illustrated) so as to ensure a selection by a user. The selection of the image forming apparatus can be performed in various ways such as a selection using an IP address, a selection by a web services for devices (WSD) setting, and a selection by a name of the image forming apparatus.

The control unit 210 causes the display 231 to display a folder selection screen 231a, which is a user interface screen for selecting a folder. In this example, a Scandata folder in a window 231w of the folder selection screen 231a is selected. The control unit 210 obtains a path to the Scandata folder.

At Step S113, the control unit 210 performs the SJT generating process. The SJT generating process is a process for generating the scan job ticket. The scan job ticket may be constituted, for example, as a simple object access protocol (SOAP) message. The SOAP message of the scan job ticket is a data file that has a SOAP envelope including a SOAP main body.

The SOAP main body includes a host name (which is smith_PC in this example) of the personal computer 200, the path to the Scandata folder (c:files:Scandata in this example), the selected image forming apparatus 100, a validity period Pv, information representing various kinds of settings when scanning, and user information. The various kinds of settings for scanning include settings such as a color/monochrome selection, a resolution setting, and a data type (JPG, PDF, or a similar format) selection. The user information is information that has been recorded in the address book 141 of the image forming apparatus 100. This information is received on a user interface screen (not illustrated).

The validity period Pv, which is also referred to as validity period information, for example, may be set as follows.
(1) A date and time range setting is a method for setting date and time of a commencement and a termination of the validity period Pv. Specifically, the date and time range setting is, for example, a setting that the commencement is 1:00 P.M. Oct. 10, 2015 and the termination is 5:00 P.M. on the same day.
(2) A time limit setting is a method for setting a time limit from the commencement of the validity period Pv. Specifically, the time limit setting is, for example, a setting that the time limit is 30 minutes, being reckoned from an SJT receiving completion time t1 (described below) by the image forming apparatus 100 as the commencement. This example will be described as the validity period Pv is a time limit setting as the time limit of 30 minutes.

At Step S114, the control unit 210 can transmit or store the scan job ticket (Step S115) corresponding to a selection by a user. A transmission destination of the scan job ticket is, in this embodiment, the image forming apparatus 100. A user can read the stored scan job ticket so as to use any time.

At Step S120 (see FIG. 2), the control unit 210 performs an SJT transmitting process. The SJT transmitting process is a process where the personal computer 200 transmits the scan job ticket to the image forming apparatus 100 so as to confirm that the image forming apparatus 100 receives the scan job ticket. Thus, the control unit 210 and the communication interface unit 250 function as a scan job ticket transmitter.

Figure 5:
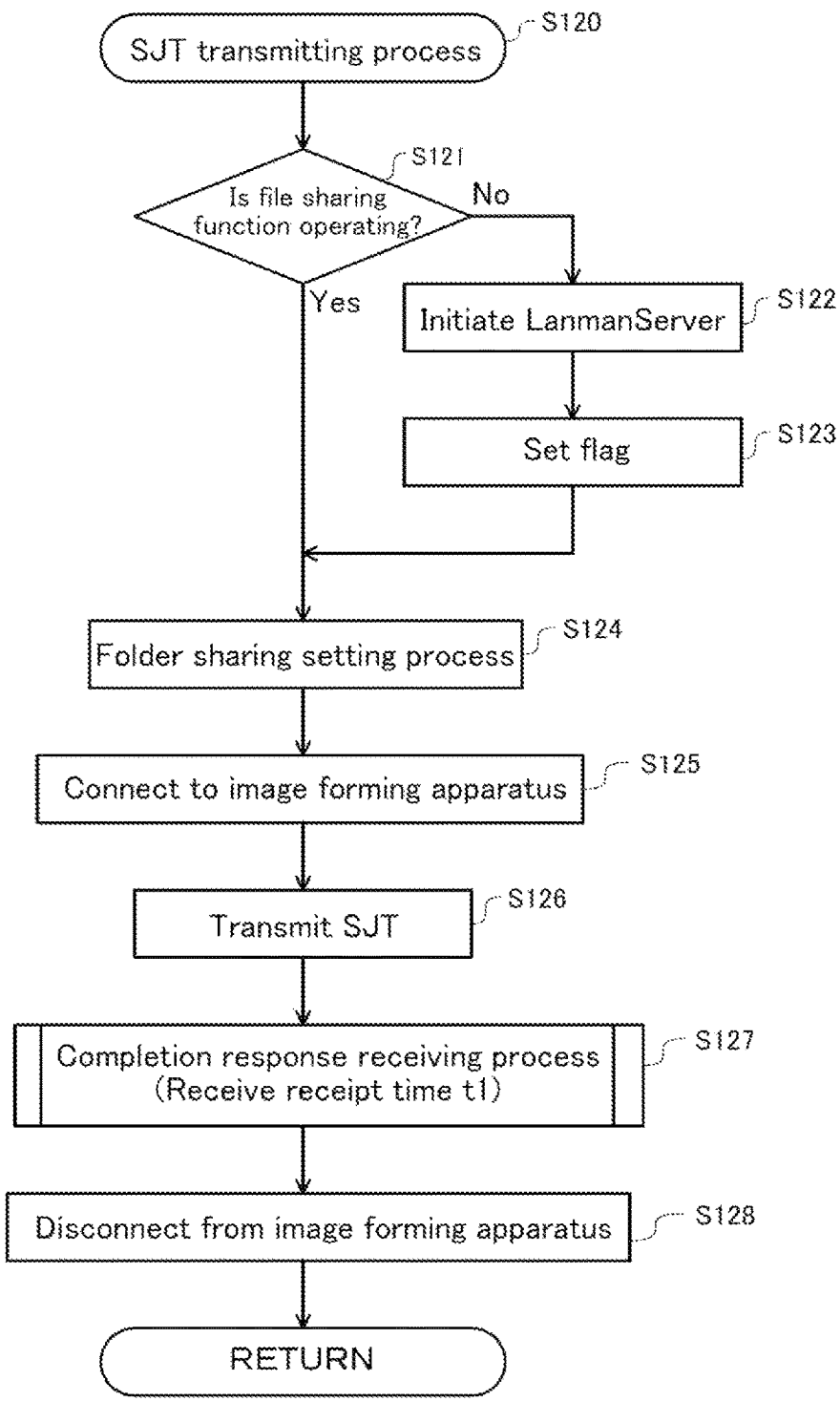
FIG. 5 illustrates a flow chart representing a content of an SJT transmitting process according to the first embodiment.

FIG. 5 illustrates a flow chart representing a content of the SJT transmitting process according to the first embodiment. At Step S121, the control unit 210 confirms whether or not a file sharing function is operating. Specifically, the control unit 210 confirms whether or not a LanmanServer (LAN manager server) is operating, the LanmanServer is a service used for such as functions for a file sharing and a printer sharing on the Windows (registered trademark) platform.

The control unit 210 causes the process to proceed to Step S122 if the LanmanServer is not operating and the process to proceed to Step S124 if the LanmanServer is operating. At Step S122, the control unit 210 causes LanmanServer to start.

At Step S123, the control unit 210 sets a flag that the control unit 210 has initiated the LanmanServer. This flag is used for returning it to an original state (a state that the LanmanServer is not operating) after the entire processes by the scan job ticket have been completed.

At Step S124, the control unit 210 performs a folder sharing setting process. The folder sharing setting process is a process to permit the image forming apparatus 100 as a specific partner to write to a folder. The folder sharing setting process is performed to the Scandata folder using, for example, "/grant" parameter on Net Share command. The folder sharing setting process is performed using a path, which identifies the Scandata folder, stored in the scan job ticket.

At Step S125, the control unit 210 connects to the image forming apparatus 100, which is selected at Step S112, using the communication interface unit 250. At Step S126, the personal computer 200 transmits the scan job ticket configured as the SOAP message to the image forming apparatus 100.

At Step S127, the personal computer 200 performs a completion response receiving process from the image forming apparatus 100. The personal computer 200 receives a communication that the image forming apparatus 100 has completed a receipt of the scan job ticket. The completion response receiving process is a process performed in response to this receiving. At Step S128, the personal computer 200 disconnects the communication with the image forming apparatus 100 in response to this receiving of a receipt completion response. The details of a content of the completion response receiving process will be described later.

Figure 6:
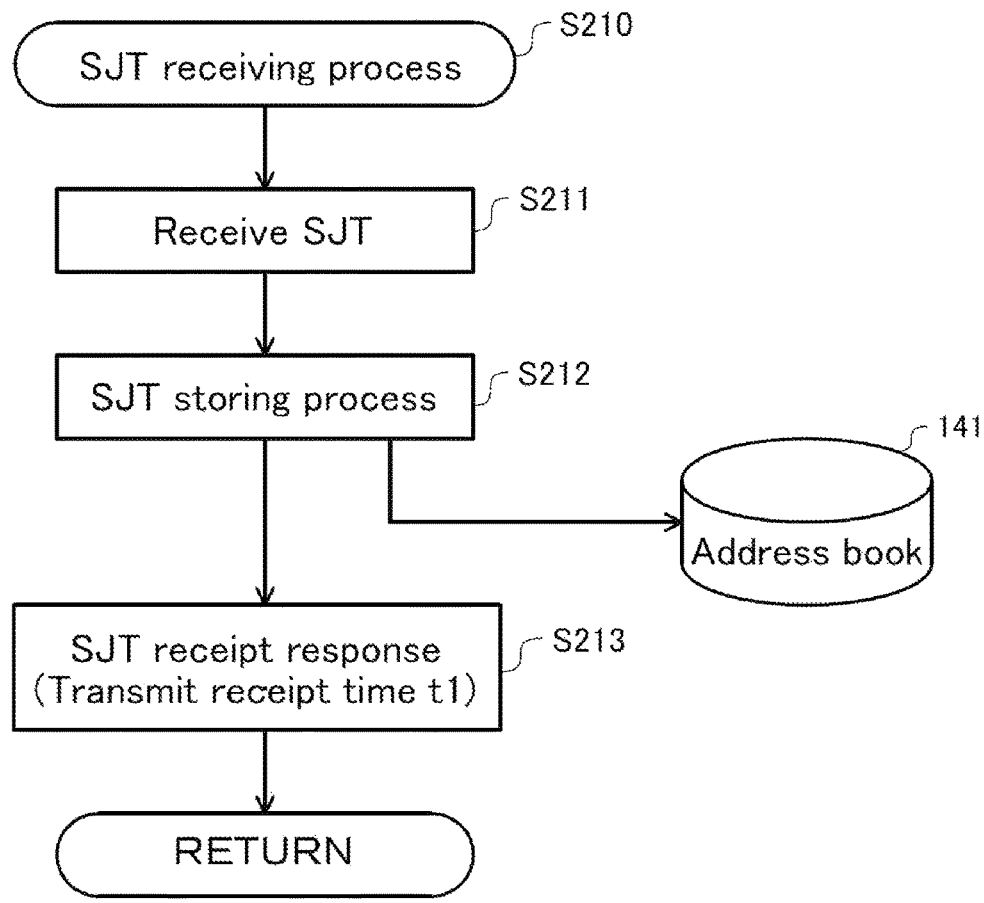
FIG. 6 illustrates a flow chart representing a content of an SJT receiving process according to the first embodiment.

FIG. 6 illustrates a flow chart representing a content of an SJT receiving process according to the first embodiment. At Step S210, the control unit 110 performs the SJT receiving process using the communication interface unit 150. The SJT receiving process, which is concurrently and simultaneously performed with the SJT transmitting process, is a process where the image forming apparatus 100 receives the scan job ticket (SJT) to become ready to accept a receipt by a user. Thus, the control unit 110 and the communication interface unit 150 function as a scan job ticket receiver.

At Step S211, the image forming apparatus 100 receives the scan job ticket (SJT). At Step S212, the control unit 110 performs an SJT storing process. The SJT storing process is a process for confirming that the scan job is a job from a user recorded in the address book 141 using user information included in the scan job ticket, thus storing the scan job ticket. The storing of the scan job ticket is, for example, a process for storing the scan job ticket in the storage unit 140 while associating the scan job ticket with user information recorded in the address book 141 or data inside or outside the image forming apparatus 100 such as an external user management database.

At Step S213, the control unit 110 performs an SJT receipt response process. The SJT receipt response process is a process for returning information that the scan job ticket is received on the image forming apparatus 100 with the validity period information representing the receipt time t1 to the personal computer 200. The personal computer 200 performs the completion response receiving process (Step S127) in response to the SJT receipt response process.

Figure 7:
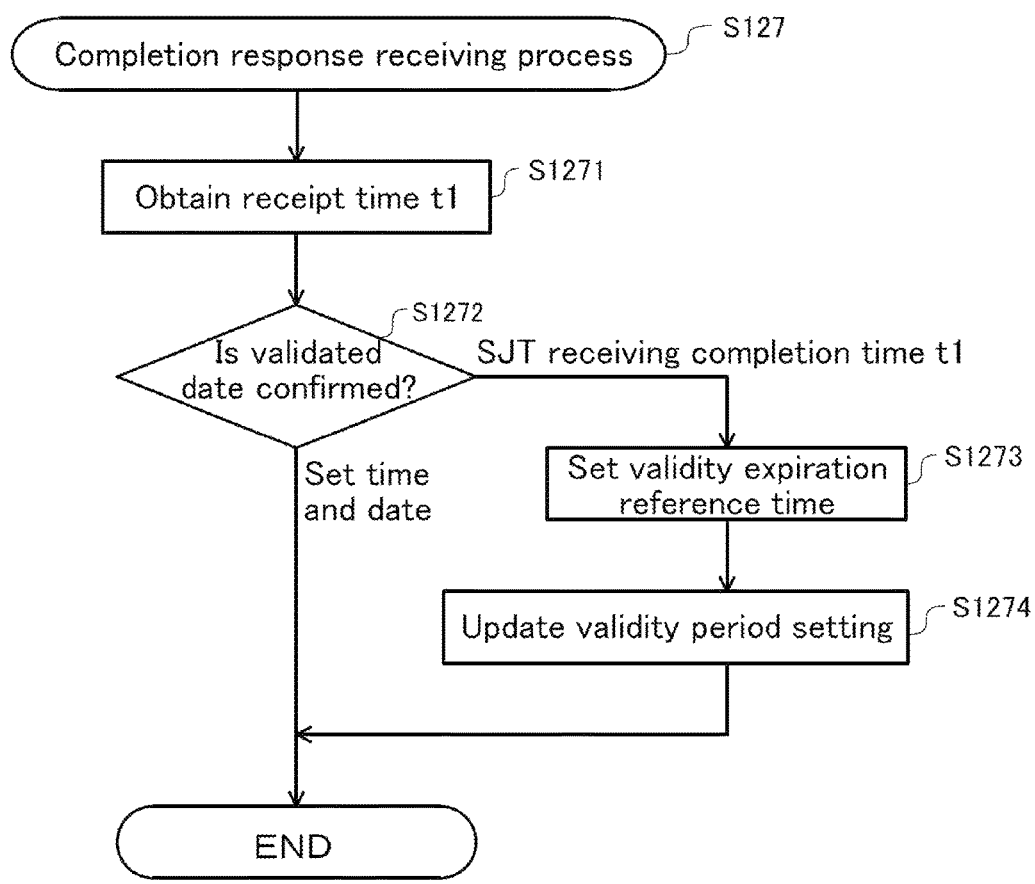
FIG. 7 illustrates a flow chart representing a content of a completion response receiving process according to the first embodiment.

FIG. 7 illustrates a flow chart representing a content of the completion response receiving process according to the first embodiment. At Step S1271, the personal computer 200 obtains the receipt time t1 from a communication message (for example, SOAP message) by the SJT receipt response process from the image forming apparatus 100. The receipt time t1 is also referred to as a SJT receiving completion time.

At Step S1272, the control unit 210 confirms a validity period. Specifically, the control unit 210 determines which is the validity period Pv included in the scan job ticket; the date and time range setting or the time limit setting. In the case of the date and time range setting, the process proceeds to Step S128 (see FIG. 5), and in the case of the time limit setting, the process proceeds to Step S1273. In this example, the validity period Pv is the time limit setting as the time limit of 30 minutes.

At Step S1273, the control unit 210 performs a validity expiration reference time setting process. The validity expiration reference time setting process, which is a process for setting a validity expiration reference time based on the scan job ticket, sets the validity expiration reference time to the SJT receiving completion time t1 as the commencement of the validity period. At Step S1274, the control unit 210 performs a validity period setting updating process. The validity period setting updating process is a process for updating the validity period of the scan job ticket, in this example, the validity period of the scan job ticket is 30 minutes from the SJT receiving completion time t1.

At Step S220 (see FIG. 2), the control unit 110 performs a scan initiating process. The scan initiating process is a process for initiating a scan operation in response to a user input to the image forming apparatus 100. The user receipt is also referred to as an initiation operation. The time of the user receipt is also referred to as a receipt time (time t2).

Figure 8:
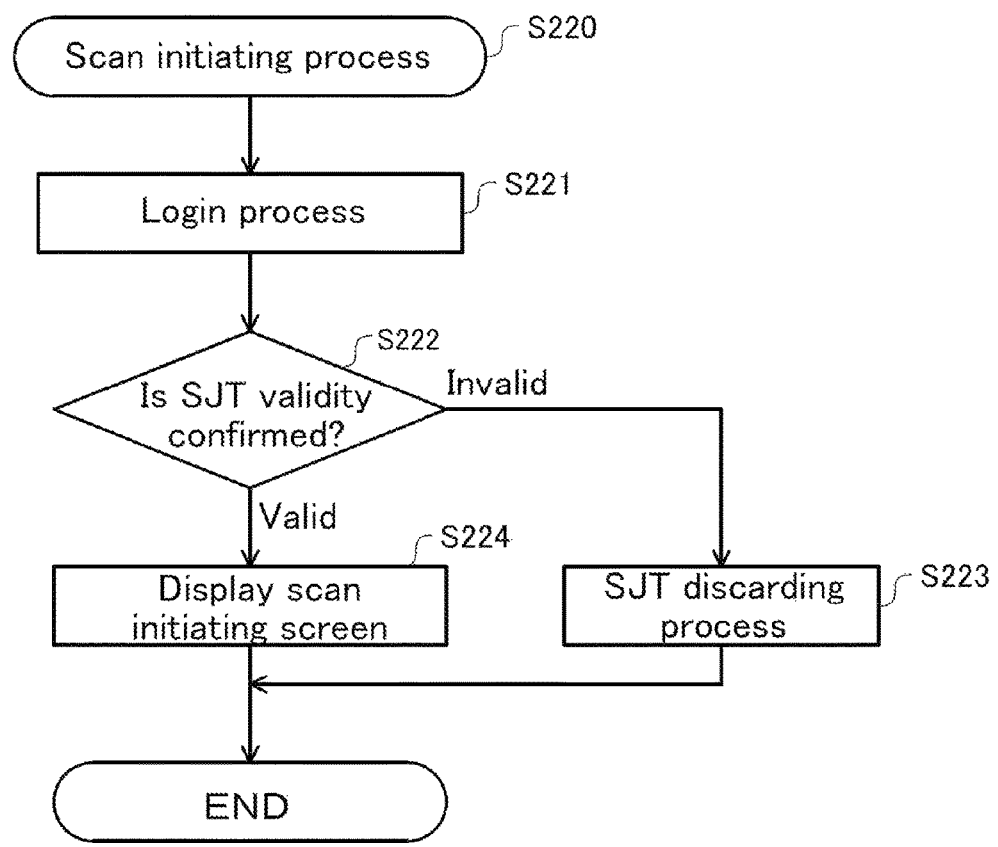
FIG. 8 illustrates a flow chart representing a content of a scan initiating process according to the first embodiment.

FIG. 8 illustrates a flow chart representing a content of the scan initiating process according to the first embodiment. At Step S221, a user logs in to the image forming apparatus 100. In response to the login, the control unit 110 reads out the scan job ticket associated with the user information recorded in the address book 141 of the user who has logged in.

At Step S222, the control unit 110 confirms an effectiveness of the scan job ticket. The SJT effectiveness is, in this example, decided based on whether or not the SJT effectiveness is within the time limit preliminarily set from the SJT receiving completion time t1 (see Step S213) as described above. That is, the control unit 110 enables the scan job ticket if the time from the receipt completion of the scan job ticket to the user login time (time t2) is within the time limit. As the base point in time when determining whether or not the SJT effectiveness is within the time limit, an accept time of the initiation operation (Step S220) may be employed instead of the login time (time t2). The login time (time t2) is also a concept included in the accept time of the initiation operation.

Specifically, assuming that the SJT receiving completion time t1 is 3:15 P.M. on Oct. 10, 2015 and the time preliminary set is 30 minutes, the login until 3:45 P.M. on 10 Oct. 2015 is decided to be valid. On the other hand, the login after 3:45 P.M. on Oct. 10, 2015 is decided to be invalid and the scan job ticket is discarded (Step S223).

At Step S224, the control unit 110 causes the display 131 to display a scan initiating screen (not illustrated) as an initial screen. The scan initiating screen displays: that the scan initiating screen is displayed due to the scan job ticket; and a setting and storage destination for scanning. A user can, for example, set a document in the ADF 160 and start scanning by touching an OK button (not illustrated).

At Step S230 (see FIG. 2), the control unit 110 causes the image scanning unit 121 to scan to generate scan data. The scan is performed based on information representing various kinds of settings for scanning, which are included in the scan job ticket. The various kinds of settings include settings such as a color/monochrome selection, a resolution setting, and a data type (JPG, PDF, or a similar format) selection. Thus, the control unit 110 and the image scanning unit 121 function as a scan data generator.

At Step S240, the control unit 110 transmits the scan job, which includes the scan data, to the personal computer 200. Thus, the control unit 110 functions as a scan data store processing unit.

At Step S130, the personal computer 200 receives the scan job and stores the scan data into the predetermined selected Scandata folder. This allows a user to store the desired scan data to the desired folder.

At Step S140 (see FIG. 2), the control unit 210 performs an SJ completion process. The SJ completion process is a process for returning a LAN state such as the folder sharing setting and the LanmanServer operation, which are required for the scan job ticket process, to the state before the scan job ticket process.

This causes the image forming system 10 to limit a folder sharing state to the time required for the scan job ticket process. This reduces the decreased security of the personal computer 200 by the folder sharing. The image forming system 10 can further return the LAN state such as the LanmanServer operation to the state before the scan job ticket process, thus ensuring the reduced influence to this system.

The control unit 210, for example, even in the following cases, performs the SJ completion process (Step S140) and displays an error display (not illustrated) on the display 231.
(1) Abnormal termination of the SJT transmitting process (Step S120)
(2) Discard of the scan job ticket (Step S223)

Figure 9:
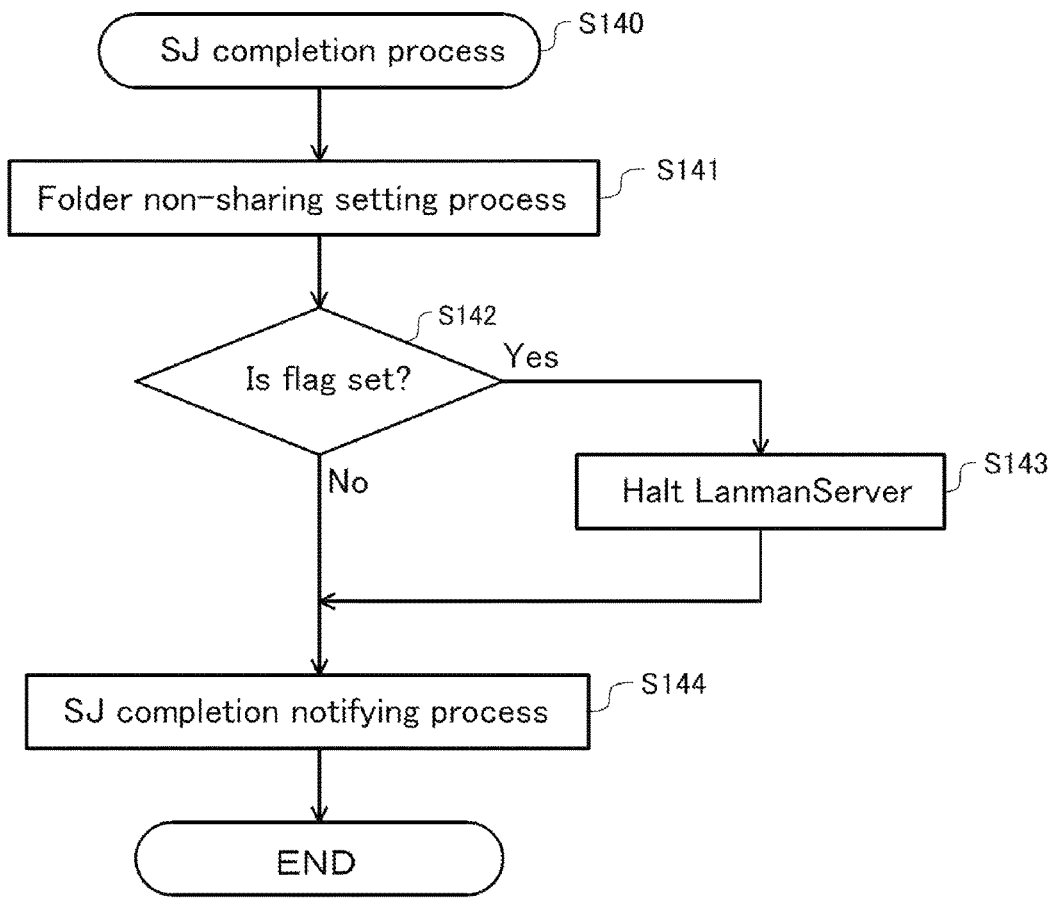
FIG. 9 illustrates a flow chart representing a content of an SJ completion process according to the first embodiment.

FIG. 9 illustrates a flow chart representing a content of the SJ completion process according to the first embodiment. At Step S141, the control unit 210 performs a folder non-sharing setting process. The folder non-sharing setting process is a process for returning the Scandata folder in a sharing setting by the folder sharing setting process (Step S124) to a non-sharing setting.

The folder non-sharing setting process is performed, for example, using "/delete" parameter on Net Share command to the Scandata folder. The folder non-sharing setting process is performed using a path identifying the Scandata folder stored in the scan job ticket.

At Step S142, the control unit 210 determines whether or not the LanmanServer is initiated by the scan job ticket process. The determination whether or not the LanmanServer has been initiated is performed corresponding to a presence or absence of the setting of the flag indicative of initiation of the LanmanServer at Step S122. The control unit 210 halts the LanmanServer when the flag is set (Step S143).

At Step S144, the control unit 210 performs a scan job (SJ) completion notifying process. The SJ completion notifying process is a process for transmitting a notification that all the processes by the scan job ticket have been completed to the image forming apparatus 100. Thus, the SJ completion process can return the LAN state such as the folder sharing setting and the LanmanServer operation, which are required for the scan job ticket process, to the state before the scan job ticket process.

At Step S250 (see FIG. 2), the control unit 110 performs an SJ completion display. The SJ completion display is a process for displaying that all the processes by the scan job ticket have been completed on the display 131 of the image forming apparatus 100. This allows a user to leave from the image forming apparatus 100 after confirming the scan data is stored in the Scandata folder of the personal computer 200.

Figure 10:
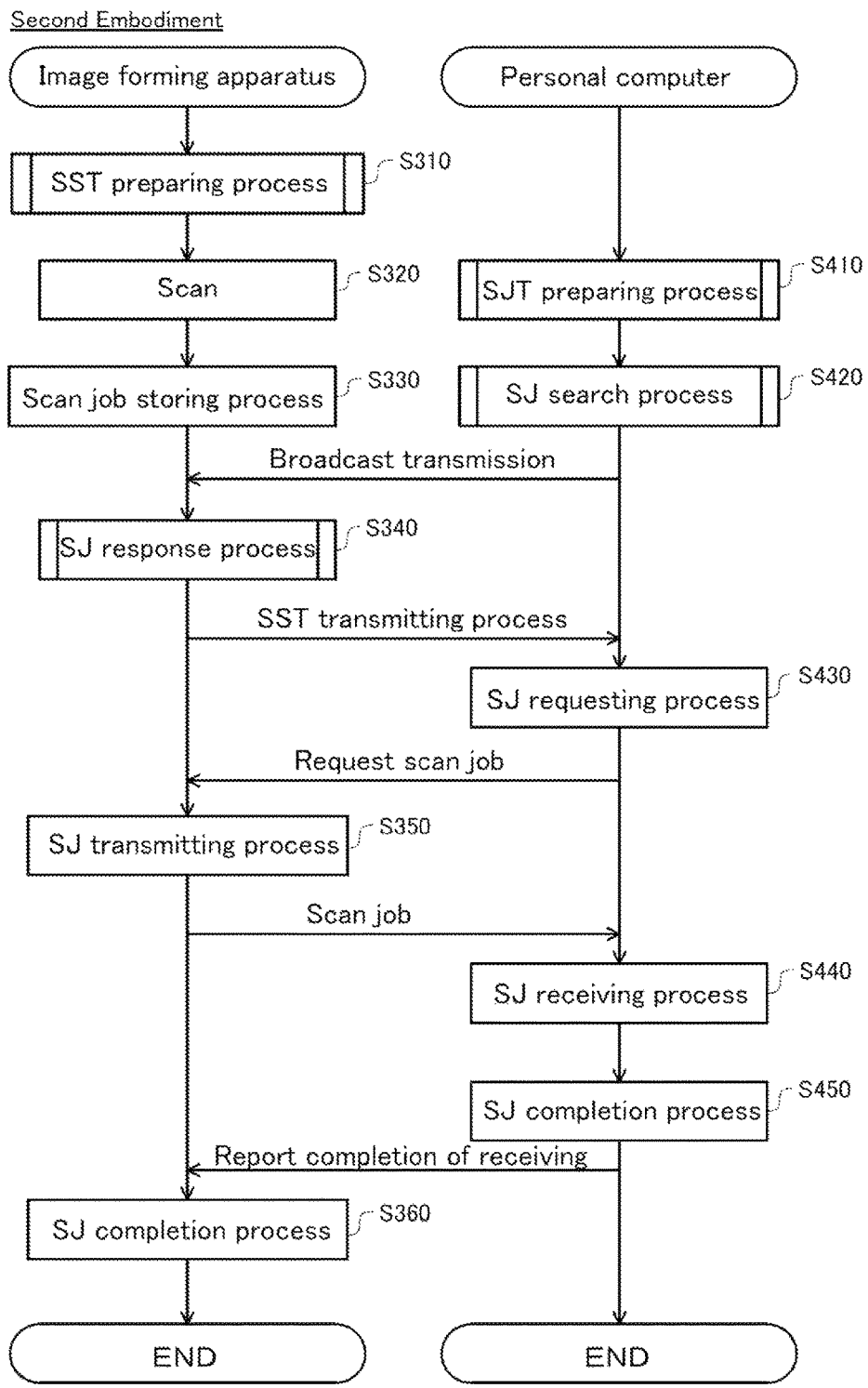
FIG. 10 illustrates a flowchart representing a content of a scan data storing process according to a second embodiment.

Accordingly, the image forming system 10 according to the first embodiment can scan a document, generate scan data, obtain an access permission of the specified storage region, and achieves the sequence of job for storing the scan data without performing a setting operation that requires the time at the image forming apparatus 100. This ensures the improved operability, which leads to the operational efficiency, of the image forming apparatus 100 while ensuring the image forming apparatus 100 to perform a complicated process B. Second Embodiment FIG. 10 illustrates a flowchart representing a content of a scan data storing process according to a second embodiment. The scan data storing process according to the second embodiment can be achieved by an identical hardware configuration to the one of the first embodiment.

At Step S310, the user performs an SST preparing process on the image forming apparatus 100. The SST preparing process is a process that prepares a scan send ticket (SST). The scan send ticket is a ticket as a data file for performing a job that stores preliminary obtained scan data in a predetermined folder in the storage unit 240 in the personal computers 200 in response to the receiving of the scan job ticket.

Figure 11:
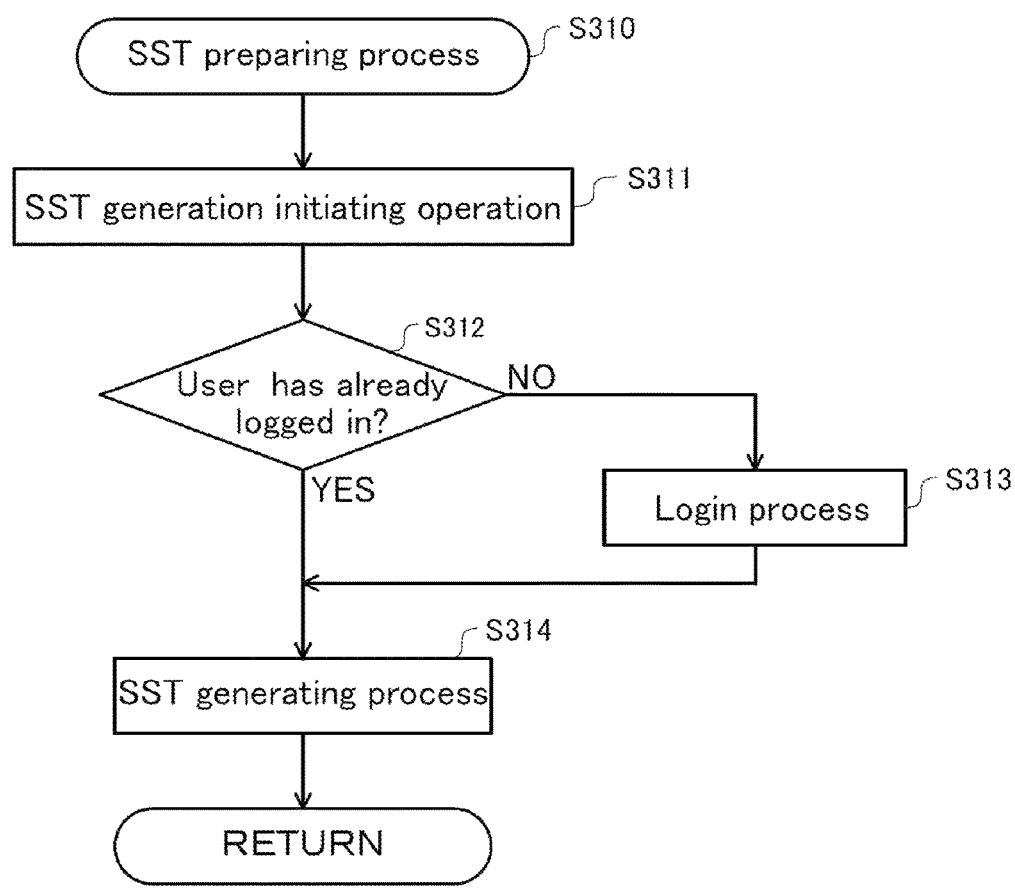
FIG. 11 illustrates a flowchart representing a content of a scan send ticket (SST) preparing process according to the second embodiment.
Figure 12:
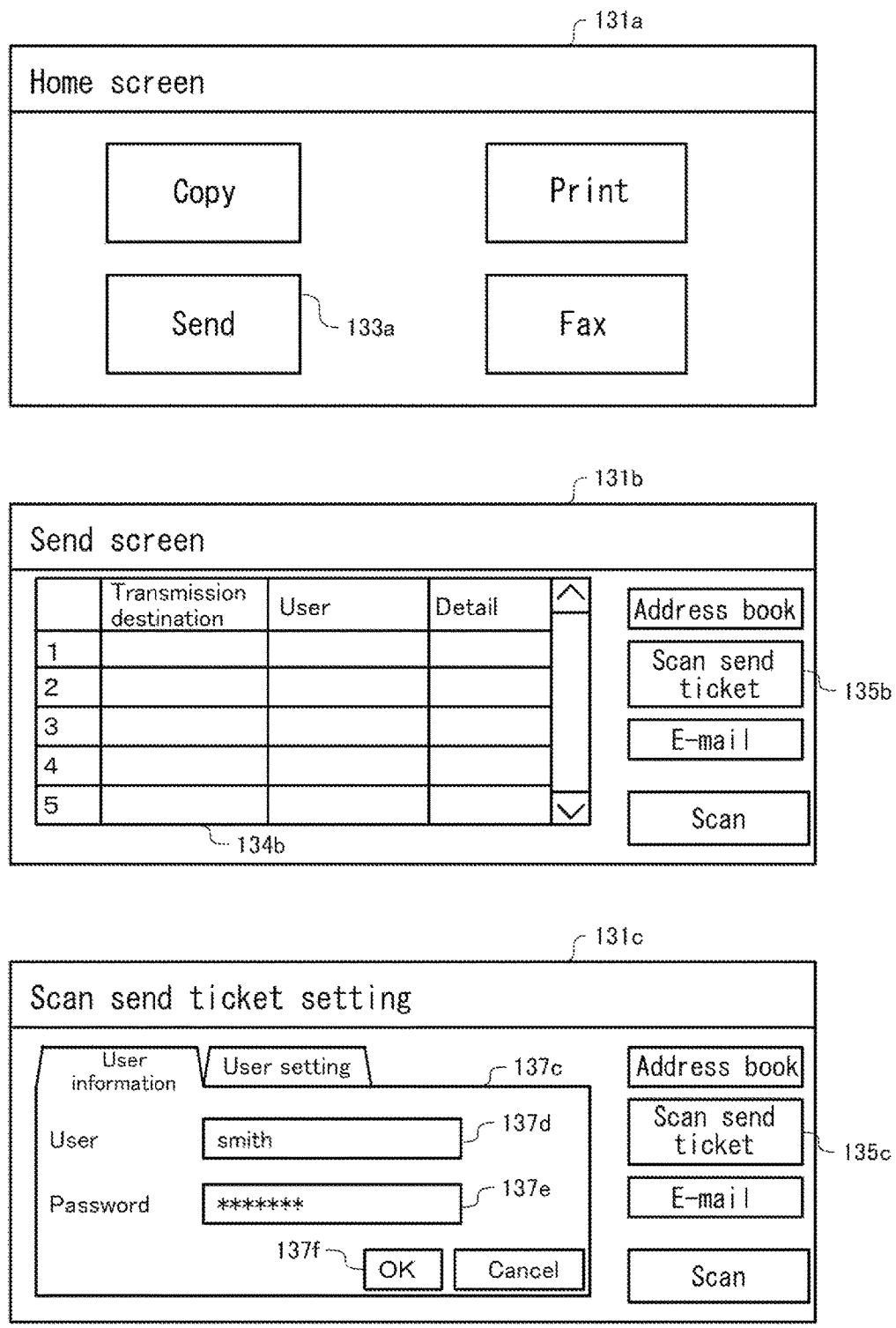
FIG. 12 illustrates an explanatory view representing a user interface screen used at the SST preparing process according to the second embodiment.

FIG. 11 illustrates a flowchart representing a content of a scan send ticket (SST) preparing process according to the second embodiment. FIGS. 12 and 13 are explanatory views representing user interface screens 131a to 131e used at the SST preparing process according to the second embodiment. The control unit 110 displays a home screen 131a as an initial screen in the display 131. The home screen 131a provides options of a transmitting function. The control unit 110 displays a send screen 131b in the display 131 in response to the selection of the transmitting function by the user.

At Step S311, the user can perform an SST generation initiating operation on the send screen 131b. The SST generation initiating operation is an operation that causes the image forming apparatus 100 to initiate a generation of the scan send ticket. The SST generation initiating operation can be performed by touching a scan send ticket icon 135b.

At Step S312, the control unit 110 determines whether or not a user has already logged in the image forming apparatus 100. This is because the scan data storing process according to the second embodiment is a process that requires a user authentication as described below. When the user has already logged in, the process proceeds to Step S314. When the user has not logged in, the process proceeds to Step S313. At Step S313, the control unit 110 displays a scan send ticket setting screen 131c that inquires user information for login in the display 131.

At Step S313, the control unit 110 displays the scan send ticket setting screen 131c including a user information tab 137c in the display 131. The user can log in the image forming apparatus 100 by inputting user information (user name and password) for login in a user name field 137d and a password field 137e, and pressing an OK icon 137f. The control unit 110 can perform an authentication necessary for login by using a user name and a password read out from the user information storage region 143.

The control unit 110 displays a scan send ticket setting screen 131d including a user setting tab 138d in the display 131 in response to the login. The user can set a scan send ticket validity period on the user setting tab 138d. The user can set any validity period by selecting "ON" on a radio button 138g, inputting a numerical value on a validity period field 138e, and pressing an OK icon 138f. In this example, the validity period is set from 12 A.M. to 4 P.M. on a current day.

The control unit 110 changes the user interface screen from the scan send ticket setting screen 131d to a send screen 131e in response to a touch of the OK icon 138f. On the send screen 131e, a new scan send ticket (SST) is generated automatically. In the scan send ticket, a user name of the user, who has logged in, and a host name of a PC used by the user are registered in advance. The user name and the PC host name are data read out from the user information storage region 143.

At Step S314, the control unit 110 performs a scan send ticket (SST) generating process. The SST generating process is a process that generates the scan send ticket. The scan send ticket may be, for example, constituted as a simple object access protocol (SOAP) message. The SOAP message of the scan send ticket is a data file that has a SOAP envelope including a SOAP main body. In this respect, the generation of the scan send ticket is similar to the generation of the scan job ticket. Thus, the control unit 110 functions as a scan send ticket generating unit.

The SOAP main body includes a host name (or an IP address) of the image forming apparatus 100, the validity period Pv, information representing various kinds of settings on scanning, and user information. The various kinds of settings on scanning include settings such as a color or monochrome selection, a setting of a resolution, and a selection of a data type (such AS JPG or PDF). The user information is information stored in the user information storage region 143 of the image forming apparatus 100. After completing the generation of the scan send ticket, the process proceeds to Step S320 (see FIG. 10).

At Step S320, the user can start scanning, for example, by setting an original document in the ADF 160, and touching a scan icon 136e. This scan data generated by scanning is automatically associated with the above-described scan send ticket.

At Step S330, the control unit 110 performs a scan job storing process. The scan job storing process is a process that stores the scan send ticket and the scan data associated with the scan send ticket in the available storage region, which is assigned to the user who has logged in, within the box storage region 142.

Figure 14:
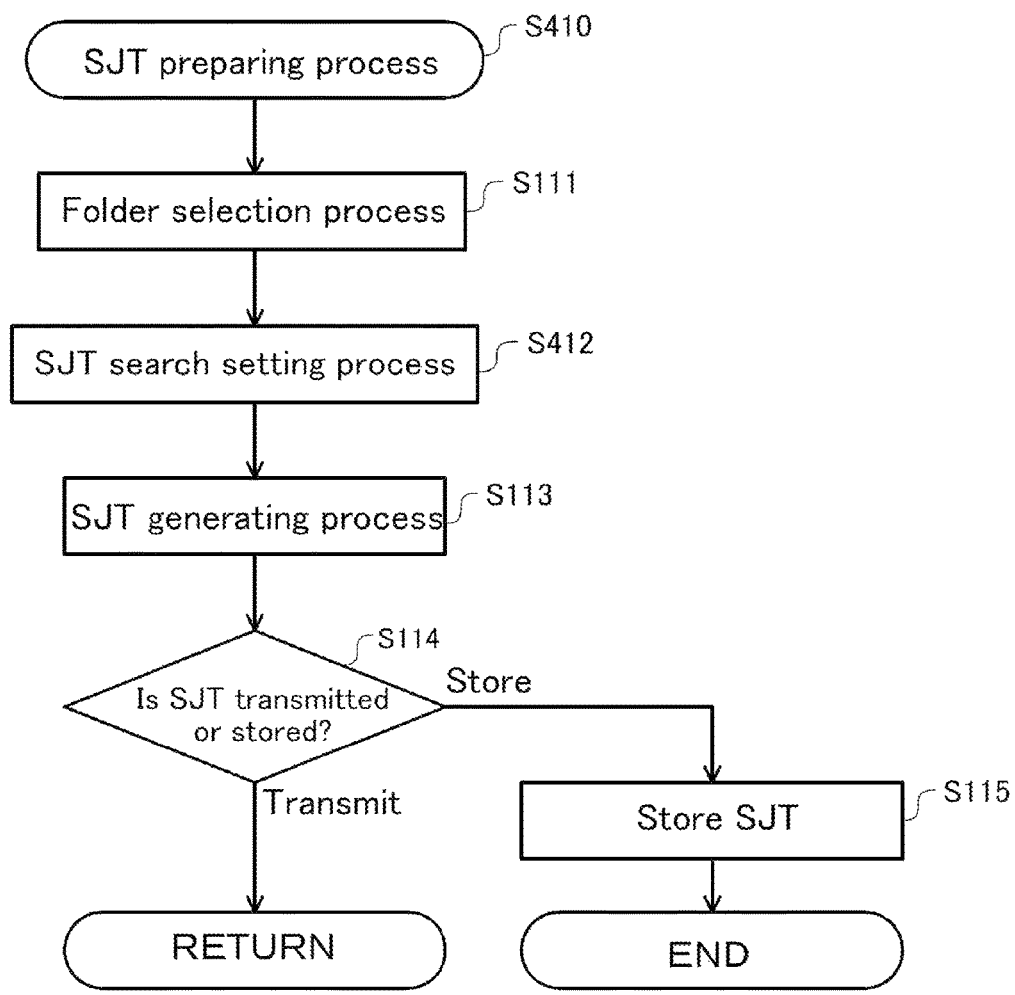
FIG. 14 illustrates a flowchart representing a content of an SJT preparing process according to the second embodiment.

FIG. 14 illustrates a flowchart representing a content of an SJT preparing process according to the second embodiment.

At Step S410, the user performs the SJT preparing process on the personal computer 200. The SJT preparing process is basically similar to the scan job ticket (SJT) preparing process at Step S110 (see FIGS. 2 and 3). However, the SJT preparing process at Step S410 is different from the SJT preparing process at Step S110 in that the image forming apparatus selecting process (Step S112) is changed to an SJT search setting process (Step S412).

The image forming apparatus selecting process (Step S112) is deleted because the image forming apparatus is not selected in advance, and the image forming apparatus is a search target by a broadcast. A content of the SJT search setting process (Step S412) is described later.

At Step S420 (see FIGS. 10 and 15), the control unit 210 performs a scan job (SJ) search process. The SJ search process is a process that transmits a scan job ticket to the plurality of image forming apparatuses 100 connected to the network by broadcast transmission, and searches a scan send ticket corresponding to the scan job ticket.

Figure 15:
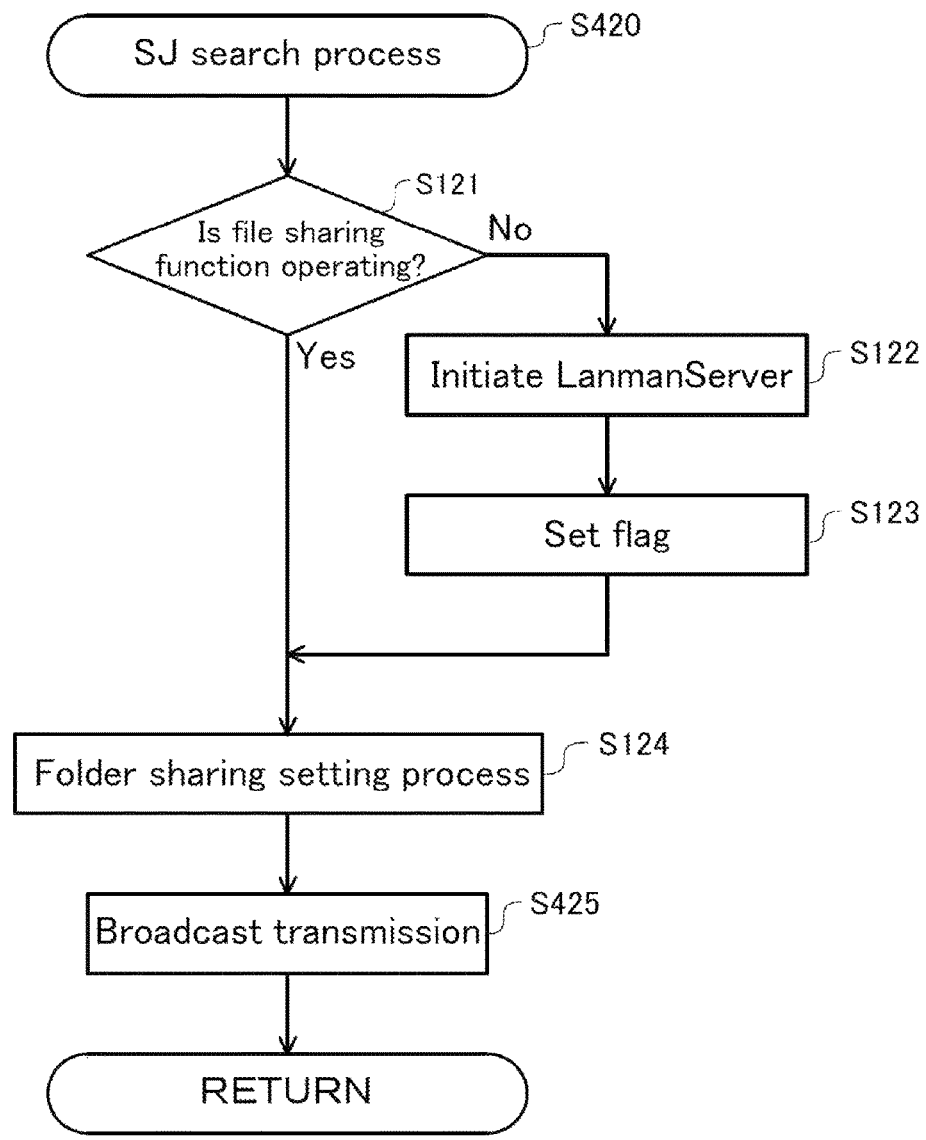
FIG. 15 illustrates a flowchart representing a content of a scan job (SJ) search process according to the second embodiment.

FIG. 15 illustrates a flowchart representing a content of the SJ search process according to the second embodiment. The SJ search process is identical to the SJT transmitting process (Step S120 in FIG. 5) at processes at Steps S121 to S124. However, the SJ search process is different from the SJT transmitting process (Step S120) in that after the folder sharing setting process (Step S124), a broadcast transmission (Step S425) is performed.

At Step S425, the personal computer 200 performs the broadcast transmission (see FIG. 10). The broadcast transmission means transmission of the scan job ticket to all the network terminals (nodes) connected to the network where the personal computer 200 is connected. Accordingly, at Step S340, the plurality of image forming apparatuses 100, which are the network terminals, perform a scan job (SJ) response process.

Figure 16:
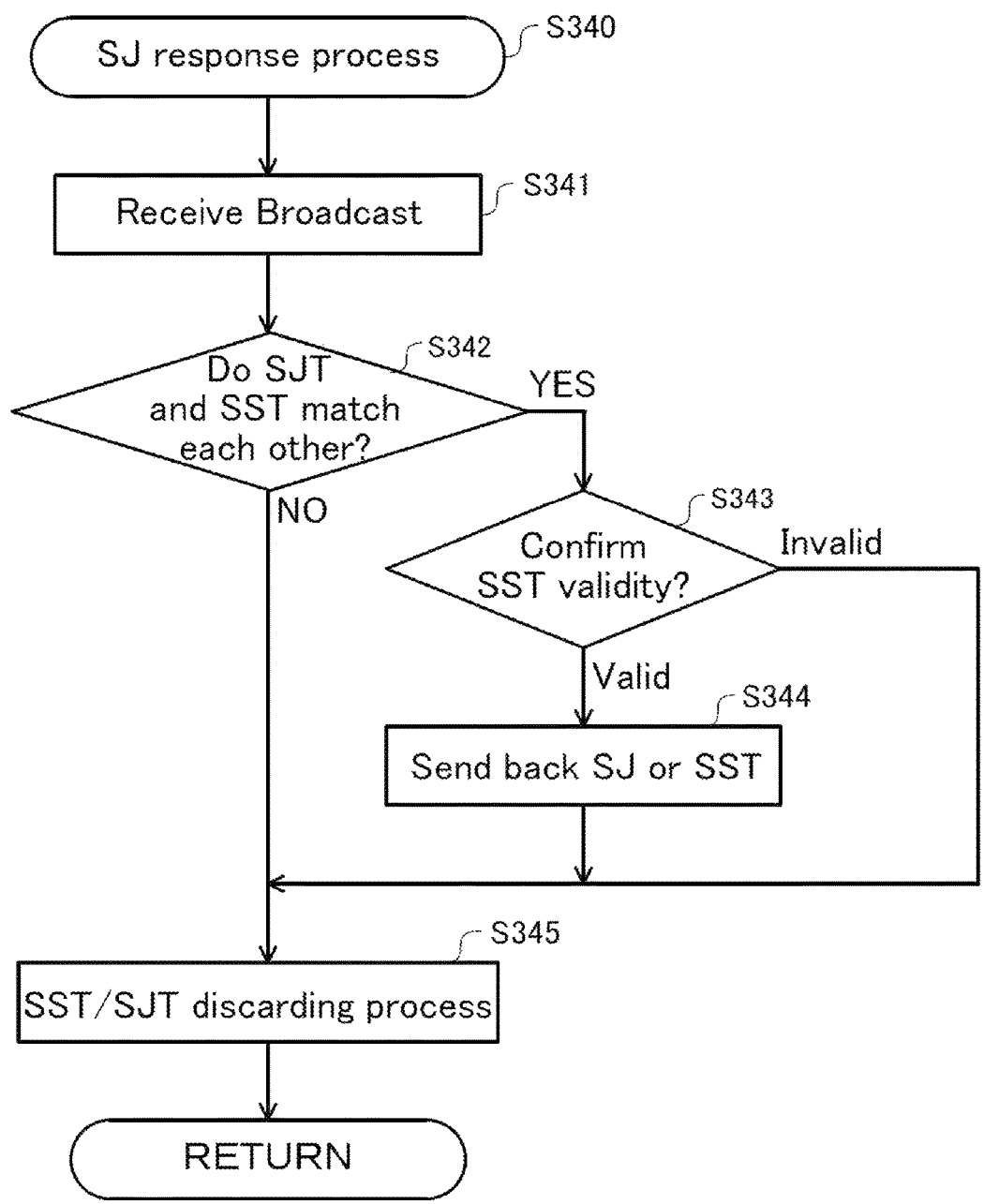
FIG. 16 illustrates a flowchart representing a content of a scan job (SJ) response process according to the second embodiment.

FIG. 16 illustrates a flowchart representing a content of the SJ response process according to the second embodiment. At Step S341, the plurality of image forming apparatuses 100 each receive the broadcast. At Step S342, the respective control units 110 of the plurality of image forming apparatuses 100 compare authentication information (user name and password) of the scan job ticket with the one of the scan send ticket. When both authentication information do not match each other, the process proceeds to Step S345. When both authentication information match each other, the process proceeds to Step S343. Thus, the control unit 110 functions as an authenticating unit.

At Step S343, the control unit 110 performs an SST effectiveness confirming process. The SST effectiveness confirming process is, for example, a process that confirms whether a time when both the authentication information matched each other is within the validity period of the scan send ticket or not. When the time is within the validity period, the process proceeds to Step S344. When the time is not within the validity period, the process proceeds to Step S345.

At Step S344, the control unit 110 sends back the scan job or the scan send ticket to a transmission source of the broadcast transmission. The control unit 110 sends back one of the scan job and the scan send ticket based on an SJT search setting in the scan job ticket. At the SJT search setting process (Step S412 in FIG. 14), the user can set any one method among following methods.

(1) To receive scan data immediately from the plurality of image forming apparatuses 100.
(2) To cause the control unit 110 to send back a scan send ticket whose authentication information matches, select reception-target scan data in the scan send ticket, and receive only the selected scan data.

In this example, the latter, (2) is selected.

At Step S345, the control unit 110 discards the scan job ticket and the scan send ticket.

At Step S430 (see FIG. 10), the control unit 210 performs a scan job (SJ) requesting process. At the SJ requesting process, the control unit 210 receives at least one scan send ticket from the plurality of image forming apparatuses 100 so as to display a list of the scan send ticket on the display 231. The user selects a reception-target scan send ticket from the list of the scan send ticket. The control unit 210 requests scan data associated with the selected scan send ticket from a corresponding image forming apparatus 100.

The selection of scan data may be a selection of each scan send ticket, and may be selectable from a plurality of pieces of scan data associated with the scan send ticket. The control unit 210, when requesting the scan data, transmits information that identifies the scan send ticket or the scan data to the image forming apparatus 100, which has sent back the scan send ticket.

At Step S350, the control unit 110 transmits the scan data associated with the specified scan send ticket or the scan job including the directly specified scan data, to the personal computer 200. Thus, the control unit 110 functions as a scan data storing processing unit.

At Step S440 (see FIG. 10), the control unit 210 performs a scan job (SJ) receiving process. At the SJ receiving process, similarly to the SJ receiving process at Step S130, the personal computer 200 receives the scan job so as to store the scan data in a predetermined selected Scandata folder. This enables the user to store desired scan data in a desired folder. An SJ completion process (Step S450) is a process whose content is identical to the one of the SJ completion process (Step S140).

At Step S360, the image forming apparatus 100 performs the SJ completion process. The SJ completion process is a process that deletes the transmitted scan data and scan send ticket from the box storage region 142. This eliminates the useless use of the box storage region 142, thus ensuring efficient use of the box storage region 142. However, it is also possible to ensure a setting for not deleting the transmitted scan data.

Thus, the image forming system 10 according to the second embodiment can employ the box storage region 142 of the image forming apparatus 100, scan an original document, and stores the scan data associated with a control data file (scan send ticket). The user simply transmits a scan job ticket from the personal computer 200 by broadcast transmission, so as to download a scan job associated with a scan send ticket whose authentication information corresponds to the transmitted scan job ticket, from the box storage region 142 to a desired store region. This ensures the improved operability of the image forming apparatus 100 while causing the image forming apparatus 100 to perform complicated processes, and furthermore to improve an operational efficiency of the image forming apparatus 100.

C. Modifications

The disclosure will not be limited to respective embodiments described above, but modifications as follows are also possible.

Modification 1

While in the first embodiment, any authority confirmation is not performed to the process of the job by the scan job ticket, for example, information about whether or not to permit the process of the job by the scan job ticket may be recorded in an address book. This configuration allows only users recorded in the address book to perform the process of the job by the scan job ticket.

Modification 2

While in the first embodiment, the process of the job by the scan job ticket is executable in response to the login, the login function is not necessarily used. Specifically, for example, a password may be required on the process of the job by the scan job ticket.

Modification 3

While in the second embodiment, the process of the job by the scan job ticket is executable in response to the login, the login function is not necessarily used. Specifically, for example, a following configuration may be possible; the configuration that allocates temporarily a guest storage region in the box storage region 142, requests respective pieces of user information (for example, user name and password input) when generating a scan send ticket and a scan job ticket, and authenticates the scan send ticket and the scan job ticket based on a match between the respective pieces of user information of the scan send ticket and the scan job ticket.

Modification 4

At the SJ requesting process of the second embodiment (Step S430 in FIG. 10), the control unit 210 is configured to transmit information, which identifies a scan send ticket or scan data, so as to obtain the scan data. However, the configuration of the control unit 210 is not limited to this. The control unit 210 may be configured to transmit information, which identifies a scan send ticket or scan data, so as to perform other jobs such as deleting the scan send ticket or the scan data, or forwarding the scan send ticket or the scan data to another image forming apparatus. In this case, job contents such as deleting and forwarding may be included in any one of the scan send ticket and the scan job ticket. However, if the control unit 210 is configured to be able to include these job contents in the scan job ticket, this can improve convenience because the scan job ticket can be set freely from a personal computer side.

Modification 5

While in the respective above-described embodiments a validity period settable by a user is employed, for example, a duration period (service life) settable only by an administrator due to a management request of a storage region in an image forming apparatus or similar apparatus. The duration period, for example, may be a certain period from a beginning of use of the storage region in the image forming apparatus or similar apparatus. The storage region is applicable to not only the storage region in the image forming apparatus, for example, but also various configurations such as a hard disk, a server, and a cloud that are connected to the network. In the storage region, data required in the disclosure such as a scan job ticket, a scan send ticket, and scan data can be stored.

Modification 6

While in the respective above-described embodiments, an image scanning system includes a personal computer and an image forming apparatus connected to the LAN, the image reading system does not necessarily include a personal computer and an image forming apparatus. Specifically, for example, an image scanning apparatus may be used instead of an image forming apparatus. Furthermore, the image scanning system may be configured by connecting a smart phone or a tablet, and the image forming apparatus with a wireless communication such as a BLUETOOTH (registered trademark). In this case, a user interface (initiation operation receiver) for initiating scan may be provided by any one of the smart phone or the tablet, and the image forming apparatus.

Modification 7

While in the respective above-described embodiments, the personal computer generates and transmits the scan job ticket and the scan data is stored in the storage region of the personal computer, the scan data is not necessarily stored in the storage region of a terminal that generates and transmits the scan job ticket. Specifically, for example, it may be generated and performed that the scan job ticket for storing it in a server computer that the personal computer has an authority to write.

Modification 8

While in the respective above-described embodiments, the personal computer is employed, the disclosure is applicable to a portable terminal such as a notebook PC and a tablet as long as the portable terminal can communicate with the image forming apparatus. The communication includes a wired communication and a wireless communication.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image scanning method, comprising:
   generating, in a terminal, a scan job ticket as a data file containing content of a job for storing scan data, generated by image scanning, in a storage;
   based on the content of the job, generating, in an image scanning apparatus, a scan send ticket as a data file for sending the scan data;
   transmitting the scan job ticket from the terminal to the image scanning apparatus;
   in response to the receiving of the scan job ticket, authenticating, in the image scanning apparatus, the scan job ticket based on authentication information in the scan send ticket; and
   in response to the authentication, storing the scan data in the storage according to the content of the job.

2. The method according to claim 1, wherein the transmitting includes transmitting the scan job ticket by broadcast transmission.

3. The method according to claim 2, further comprising:
   in response to the authentication, sending back from the image scanning apparatus to the terminal the scan send ticket used for the authentication;
   displaying, in the terminal, a user interface screen for selection of sent-back scan send tickets;
   transmitting, to the image scanning apparatus having sent back the selected scan send ticket, information for identifying the selected scan send ticket; and
   sending scan data associated with the selected scan send ticket according to the content of the job.

4. The method according to claim 1, wherein:
   the scan send ticket is associated with a plurality of scan data items;
   the method further includes
      in response to the authentication, sending back from the image scanning apparatus to the terminal the scan send ticket used for the authentication,
      displaying, in the terminal, a user interface screen for selection from the plurality of scan data items associated with the sent-back scan send ticket,
      transmitting information for identifying the selected scan data to the image scanning apparatus having sent back the selected scan send ticket, and
      sending the selected scan data according to the content of the job.

5. The method according to claim 1, wherein:
   the scan send ticket is associated with a plurality of scan data items;
   the method further includes
      in response to the authentication, sending back from the image scanning apparatus to the terminal the scan send ticket used for the authentication,
      displaying, in the terminal, a user interface screen for selection of at least either the plurality of scan data items associated with the sent-back scan send ticket, or sent-back scan send tickets,
      transmitting information for identifying at least either of a selected scan send ticket or selected scan data, to the image scanning apparatus having transmitted the selected scan send ticket, and
      sending at least either of the scan data associated with the selected scan send ticket or the selected scan data, according to the content of the job.

6. The method according to claim 1, wherein:
   the scan send ticket includes validity period information indicating a validity period for the authentication; and
   the storing includes determining whether clock time of the authentication is within the validity period indicated in the validity period information, and storing the scan data in the storage if the authentication clock time is within the validity period, and discarding the scan send ticket and the scan job ticket if the authentication clock time is not within the validity period.

7. The method according to claim 1, further comprising:
   determining whether the storage is configured to allow the image scanning apparatus to store the scan data in the storage; and
   changing the configuration of the storage so as to allow the image scanning apparatus to store the scan data in the storage if the storage is configured not to allow the image scanning apparatus to store the scan data.

8. The method according to claim 1, further comprising:
   if the storage is configurationally altered, setting a flag signifying the configurational change; and
   returning the storage to its original configuration based on the flag, in response to a notification of completion of a process according to the scan job ticket.

9. The method according to claim 1, further comprising:
   storing the scan send ticket in the image scanning apparatus; and
   reading out the scan send ticket from the image scanning apparatus in response to the receiving of the scan job ticket.

10. An image scanning apparatus for connection to a storage via a network, comprising:

a scan job ticket receiver configured to receive a scan job ticket as a data file containing content of a job for storing scan data, generated by image scanning, in the storage;

a scan send ticket generating unit configured to generate, according to the content of the job, a scan send ticket as a data file for sending the scan data; and an authenticating unit configured to authenticate, in response to the receiving of the scan job ticket, the scan job ticket based on authentication information in the scan send ticket; wherein the storage is caused to store, in response to the authentication, the scan data according to the content of the job.

11. The image scanning apparatus according to claim 10, further comprising a scan data storing processing unit configured to cause, in response to the authentication, the storage to store, based on the content of the job, scan data associated with the scan send ticket.

12. The image scanning apparatus according to claim 10, wherein:

the scan send ticket includes validity period information indicating a validity period for the authentication; and the storing includes determining whether clock time of the authentication is within the validity period indicated in the validity period information, and storing the scan data in the storage if the authentication clock time is within the validity period, and discarding the scan send ticket and the scan job ticket if the authentication clock time is not within the validity period.

13. An image scanning system, comprising:
the image scanning apparatus according to claim 10; and
a terminal;
wherein the terminal includes
a scan job ticket generator configured to generate the scan job ticket, and
a scan job ticket transmitter configured to transmit the scan job ticket from the terminal to the image scanning apparatus.

14. The image scanning system according to claim 13, wherein the scan job ticket transmitter transmits the scan job ticket by broadcast transmission in the terminal.

15. The image scanning system according to claim 14, wherein:

in response to the authentication, the image scanning apparatus sends back to the terminal the scan send ticket used for the authentication;

the terminal displays a user interface screen for selection of sent-back scan send tickets;

the terminal transmits, to the image scanning apparatus having sent back the selected scan send ticket, information for identifying the selected scan send ticket; and the image scanning apparatus sends scan data associated with the selected scan send ticket according to the content of the job.

16. The image scanning system according to claim 13, wherein:

the scan send ticket is associated with a plurality of scan data items;

in response to the authentication, the image scanning apparatus sends back to the terminal the scan send ticket used for the authentication;

the terminal displays a user interface screen for selection from the plurality of scan data items associated with the sent-back scan send ticket;

the terminal transmits information for identifying the selected scan data to the image scanning apparatus having sent back the selected scan send ticket; and the image scanning apparatus sends the selected scan data according to the content of the job.

17. The image scanning system according to claim 13, wherein the terminal determines whether the storage is configured to allow the image scanning apparatus to store the scan data in the storage, and changes the configuration of the storage so as to allow the image scanning apparatus to store the scan data in the storage if the storage is configured not to allow the image scanning apparatus to store the scan data.

18. The image scanning system according to claim 13, wherein if the storage is configurationally altered, the terminal sets a flag signifying the configurational change, and returns the storage to its original configuration based on the flag in response to a notification of completion of a process according to the scan job ticket.

19. A non-transitory computer-readable recording medium storing an image scanning program to control an image scanning apparatus for connection to a storage via a network, the image scanning program causing the image scanning apparatus to function as:

a scan job ticket receiver configured to receive a scan job ticket as a data file containing content of a job for storing scan data, generated by image scanning, in the storage;

a scan send ticket generating unit configured to generate, according to the content of the job, a scan send ticket as a data file for sending the scan data;

an authenticating unit configured to authenticate, in response to the receiving of the scan job ticket, the scan job ticket based on authentication information in the scan send ticket; wherein the storage is caused to store, in response to the authentication, the scan data according to the content of the job.

20. The recording medium according to claim 19, wherein the image scanning program further causes the image scanning apparatus to function as a scan data storing processing unit configured to cause, in response to the authentication, the storage to store, based on the content of the job, scan data associated with the scan send ticket.

* * * * *